United States Patent
Kelly et al.

(10) Patent No.: US 7,387,759 B2
(45) Date of Patent: *Jun. 17, 2008

(54) SYSTEM AND METHOD FOR CURING POLYMERIC MOLDINGS HAVING A MASKING COLLAR

(75) Inventors: William Michael Kelly, Lawrenceville, GA (US); Allen Gilliard, Buford, GA (US); George Burnett, Conyers, GA (US); John Michael Dilworth, Roswell, GA (US)

(73) Assignee: Novartis AG, Basel (CH)

( * ) Notice: Subject to any disclaimer, the term of this patent is extended or adjusted under 35 U.S.C. 154(b) by 206 days.

This patent is subject to a terminal disclaimer.

(21) Appl. No.: 10/724,677

(22) Filed: Dec. 1, 2003

(65) Prior Publication Data

US 2004/0140578 A1    Jul. 22, 2004

Related U.S. Application Data

(60) Provisional application No. 60/434,179, filed on Dec. 17, 2002.

(51) Int. Cl.
*B29C 33/40* (2006.01)
*B29D 11/00* (2006.01)

(52) U.S. Cl. .................. 264/496; 249/134; 264/2.5; 264/1.38; 425/174.4; 425/808

(58) Field of Classification Search .......... 264/1.1, 264/2.5, 1.36, 1.38, 104, 105, 494, 496; 425/808, 425/174.4; 249/134, 135
See application file for complete search history.

(56) References Cited

U.S. PATENT DOCUMENTS

| 4,382,902 | A | * | 5/1983 | Feurer ................... 264/1.36 |
| 5,782,460 | A | | 7/1998 | Kretzschmar et al. ..... 264/1.36 |
| 6,491,281 | B1 | | 12/2002 | Gotou et al. ............ 249/114.1 |
| 6,551,531 | B1 | * | 4/2003 | Ford et al. ................. 264/2.5 |
| 6,627,124 | B1 | * | 9/2003 | Herbrechtsmeier et al. ................ 264/1.36 |
| 6,638,451 | B1 | | 10/2003 | Hagmann et al. .......... 264/1.38 |
| 6,719,929 | B2 | * | 4/2004 | Winterton et al. .......... 264/1.7 |

FOREIGN PATENT DOCUMENTS

| WO | WO 99/20455 | 4/1999 |
| WO | WO 00/40395 | 7/2000 |
| WO | WO 00/59713 | 10/2000 |

OTHER PUBLICATIONS

European Search Report.

* cited by examiner

Primary Examiner—Mathieu D. Vargot
(74) Attorney, Agent, or Firm—Sheng-Hsin Hu (57) ABSTRACT

A system and method for forming a polymeric molding. A mold component includes a transmissive portion for passing curing energy such as UV light into the mold cavity. A masking collar is engaged around the transmissive portion to block curing energy from exposing and curing polymeric material outside of the region underlying the transmissive portion.

15 Claims, 6 Drawing Sheets

SYSTEM AND METHOD FOR CURING POLYMERIC MOLDINGS HAVING A MASKING COLLAR

This application claims under 35 USC § 119 (e) the benefit of the filing date of the U.S. Provisional Application No. 60/434,179 filed Dec. 17, 2002 and all references incorporated therein.

FIELD OF THE INVENTION

The present invention relates generally to the fields of manufacturing and materials processing, and more particularly to a system and method for molding and curing polymeric articles including contact lenses

BACKGROUND OF THE INVENTION

Contact lenses, intra-ocular lenses, surgical implants, and a variety of other items are manufactured by casting a dose of uncured prepolymer in a mold and curing the prepolymer. For example, U.S. Pat. No. 5,508,317, which is hereby incorporated herein by reference, discloses materials and manufacturing processes suitable for producing polymeric contact lenses and other items. One manner of curing the polymeric material in the mold is to include a photo-initiator in the material, which initiates crosslinking upon exposure to light of an appropriate wavelength. By casting the material in a mold that transmits light, polymeric crosslinking may be initiated through the mold.

For example, it is known to cast lenses between glass or quartz molds shaped to the intended dimensions of the lens. Polymeric crosslinking is initiated by exposure to ultraviolet (UV) light (i.e., electromagnetic radiation having wavelength from about 4 nanometers to about 380 nanometers) through the quartz molds. A chromium mask is applied to the quartz mold to block passage of light through portions of the mold where crosslinking is not desired, the transition between masked and unmasked portions of the mold defining an edge of the lens. A collimator or aperture in the sleeve or bushing housing the quartz mold collimates the UV light to more precisely define the lens shape. Cured lenses can be inspected in the molds by illumination with infrared light.

The manufacture of quartz molds and the application of a chromium mask to molds, however, has proven to be relatively expensive and time consuming. In addition, the provision of an aperture in the sleeve housing of a mold and the use of a chromium mask has been found to permit an undesirable degree of light spreading and reflection during the curing step, potentially resulting in curing under masked portions of the mold and the production of out-of-tolerance items.

Thus, it can be seen that needs exist for an improved system and method for curing polymeric moldings. It is to the provision of improved systems and methods meeting this and other needs that the present invention is primarily directed.

SUMMARY OF THE INVENTION

Briefly described, example embodiments of the present invention provide improved systems and methods for casting and curing polymeric moldings. In one aspect, the invention is a molding system comprising first and second mold components. At least one of said first and second mold components preferably include a transmissive portion. A masking collar preferably surrounds at least a portion of the transmissive portion. The transmissive portion allows passage of curing energy therethrough, and the masking collar substantially blocks passage of curing energy.

In another aspect, the invention is a mold component for casting and curing a polymeric item. The mold component preferably includes a transmissive portion formed of a material that is generally transparent to curing energy. The mold component preferably also includes a masking collar fitting in close engagement around at least a portion of the transmissive portion.

In yet another aspect, the invention is a molding system including a first mold component and a second mold component, engageable to define a mold cavity. The first mold component preferably includes a transmissive portion and a masking collar surrounding at least a portion of said transmissive portion. The transmissive portion allows passage of UV energy therethrough, and the masking collar substantially blocks passage of UV energy. The second mold component preferably incorporates a UV absorber.

In yet another aspect, the invention is a method of forming a polymeric molding. The method preferably includes engaging a first mold component and a second mold component to define a mold cavity. The first mold component preferably includes a UV-transmissive portion and a UV-blocking collar. The method preferably further includes depositing a dose of prepolymer material within the mold cavity, and exposing at least a portion of the prepolymer material to UV energy through the UV-transmissive portion of the first mold component.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION

Figure 1:
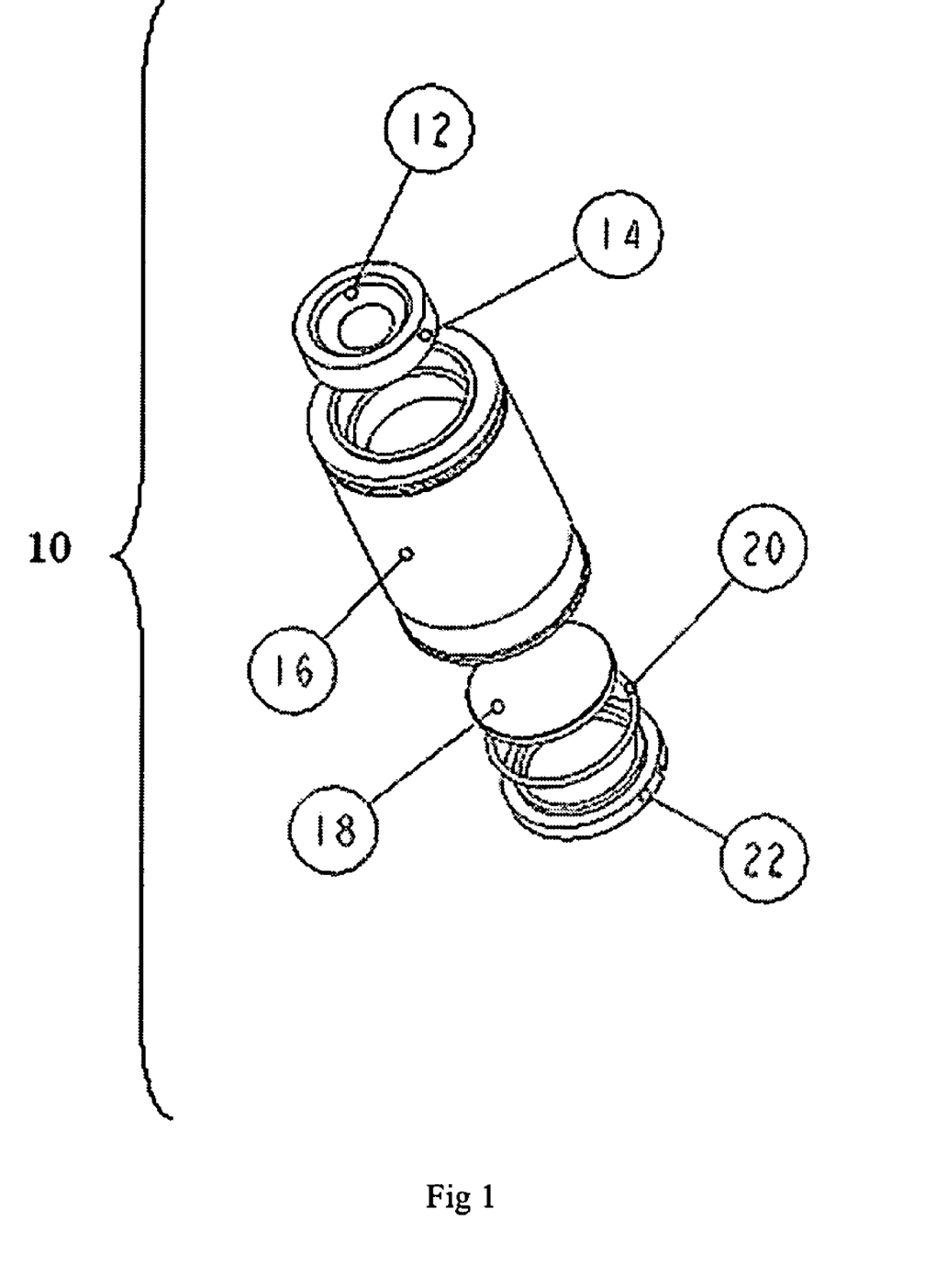
FIG. 1 shows an exploded perspective view of a female mold component, according to an example form of the present invention.
Figure 2:
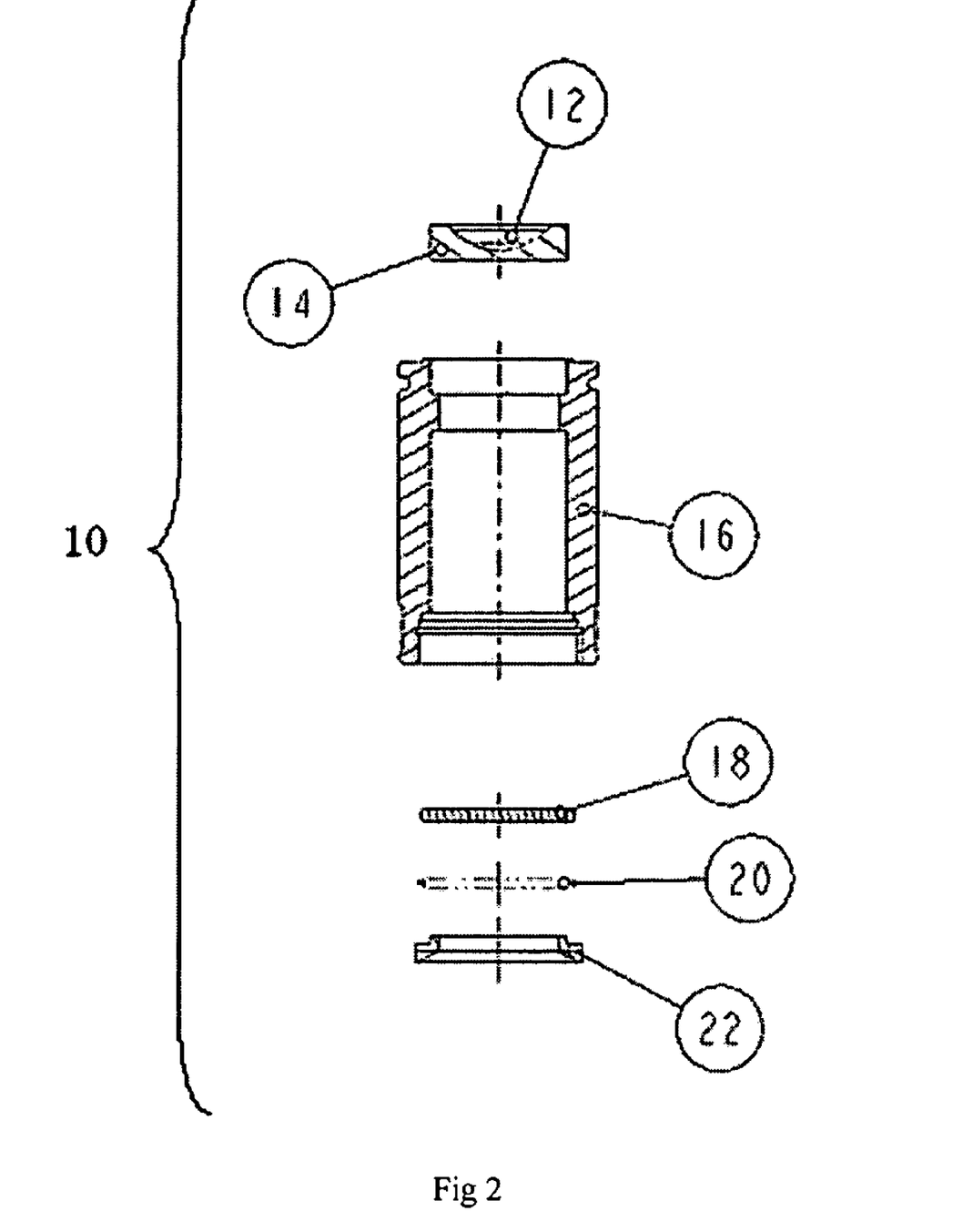
FIG. 2 shows an exploded cross-sectional view of the female mold component of FIG. 1.
Figure 3:
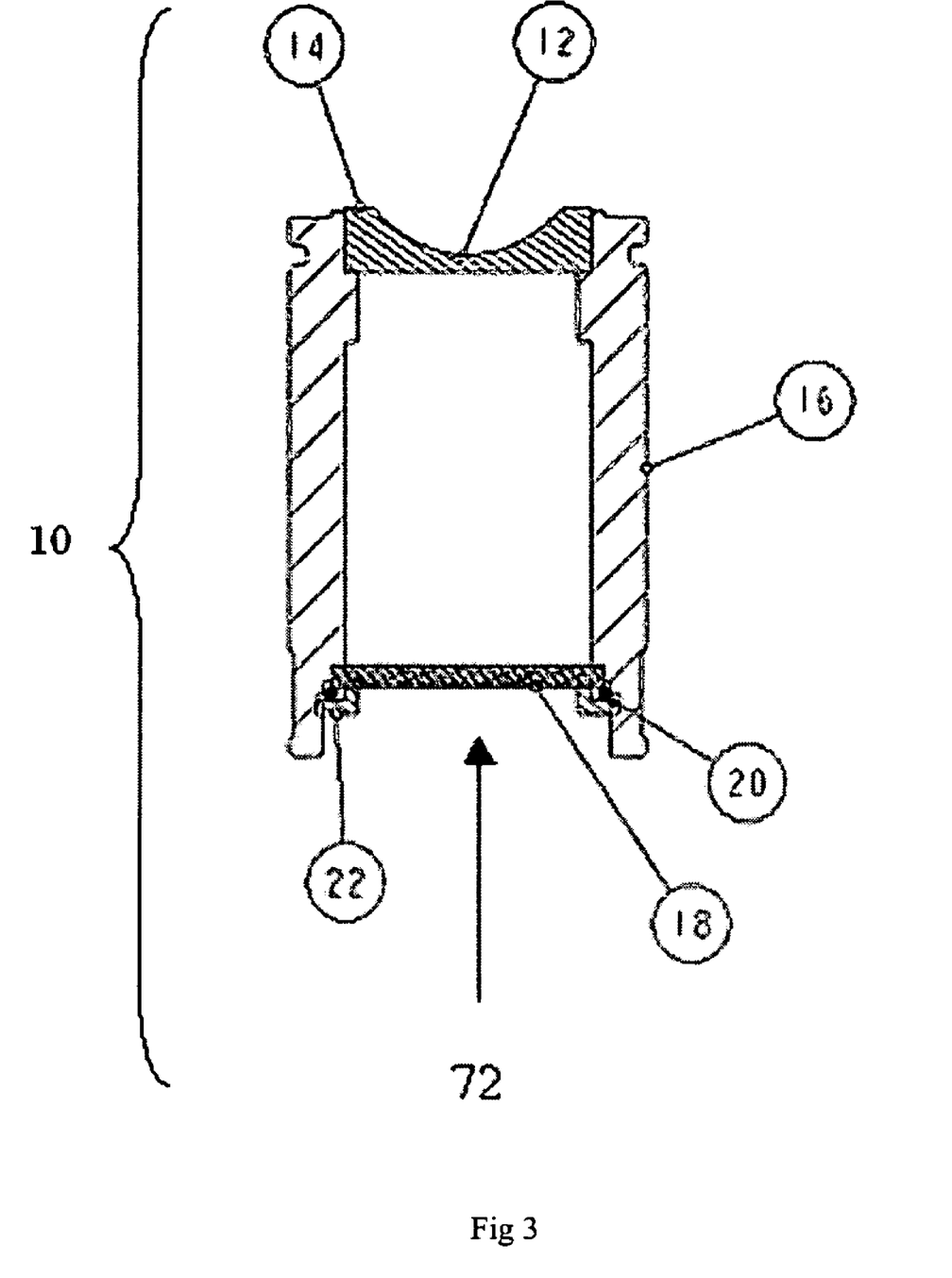
FIG. 3 shows an assembled cross-sectional view of the female mold component of FIG. 1.

The present invention may be understood more readily by reference to the following detailed description of the invention taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. In addition, as used in the specification including the appended claims, the singular forms machining or other fabrication method. The button 14 preferably comprises a generally transparent or translucent material, most preferably a polymeric material. In an example embodiment, the molding surface is a cyclic-olefin copolymer (COC), such as the generally clear amorphous copolymer of ethylene and norbornene sold under the tradename Topas®, by Ticona GmbH of Frankfurt, Germany and Summit, N.J. The button or panel 14 is optionally mounted in one end of a housing or sleeve 16, formed of a substantially rigid material such as for example brass. A glass plate 18 is preferably mounted in the other end of the sleeve 16, and secured in place by an O-ring 20 and an aluminum retainer ring 22. The housing or sleeve 16 optionally comprises mounting features for installation within a mold housing or other external carrier.

The molding surface element 14 of the mold component 10 is preferably manufactured as a unitary piece from Topas® COC or other suitable polymer(s) or other material(s), impregnated with a UV-absorptive material. The inclusion of a UV-absorptive material has been found to be advantageous, as it prevents or reduces reflection or transmission within the mold cavity of UV light used to cure the polymer of the molding, which could result in curing of the polymer in unintended regions of the mold cavity, potentially rendering a molding defective. Suitable results may be obtained, for example, using a Topas® COC grade 8007-S10 material with a blue filler for UV blocking. A suitable UV-absorptive filler material is TSP Blue No. OM51620034, obtained from Clariant Masterbatches of Muttenz, Switzerland, which is preferably mixed in about a 1:33 ratio with the clear Topas® COC. The UV-absorptive material preferably allows infrared (IR) transmittance through the mold component, to facilitate IR illumination for inspection of the moldings through the mold.

The molding surface element 14 of the mold component 10 is preferably machined from a rod or extruded piece of Topas® COC impregnated with the UV-absorptive filler. The back optics of the mold surface are preferably finished on a diamond turning center to optical tolerances. The partially finished mold is preferably press-fit into the brass sleeve 16. Referencing a surface on the upper surface of the brass sleeve 16, the front surface optics are preferably finished on a diamond turning center. After the optics are finished, the quartz window 18 is preferably installed on the bottom of the brass sleeve 16, along with the O-ring 20 and the window retainer 22.

Figure 4:
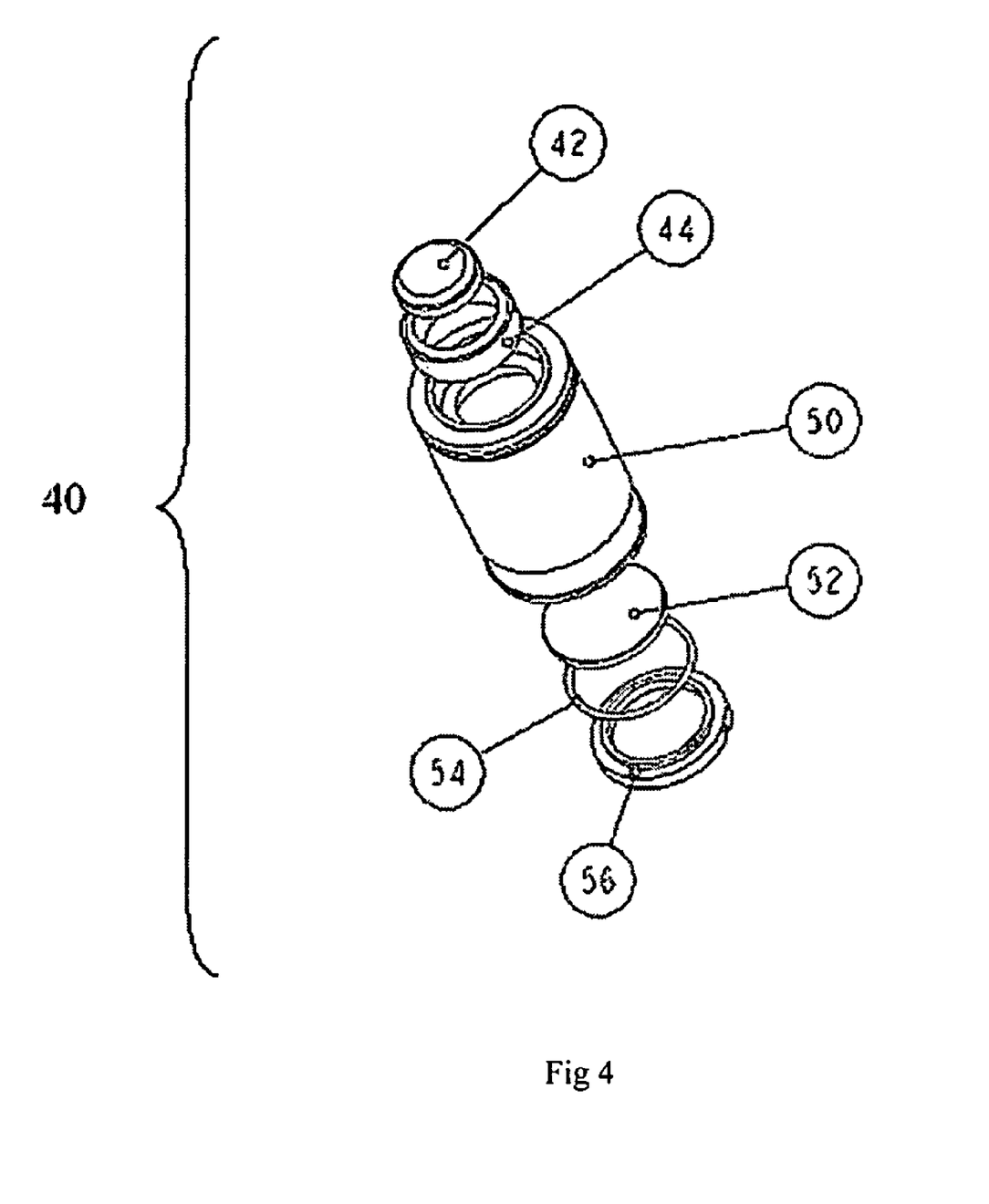
FIG. 4 shows an exploded perspective view of a male mold component, according to an example form of the present invention.
Figure 5:
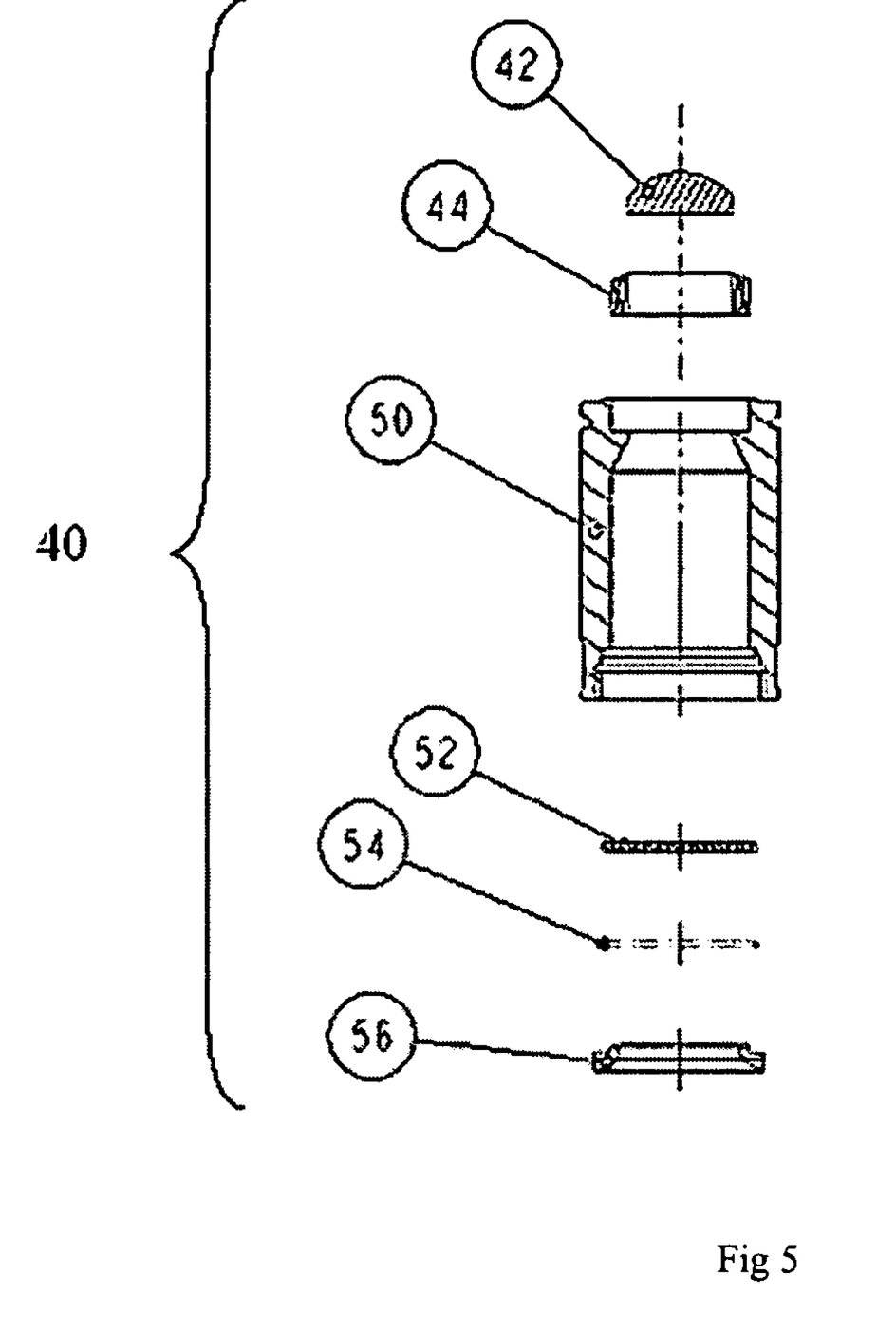
FIG. 5 shows an exploded cross-sectional view of the male mold component of FIG. 4.
Figure 6:
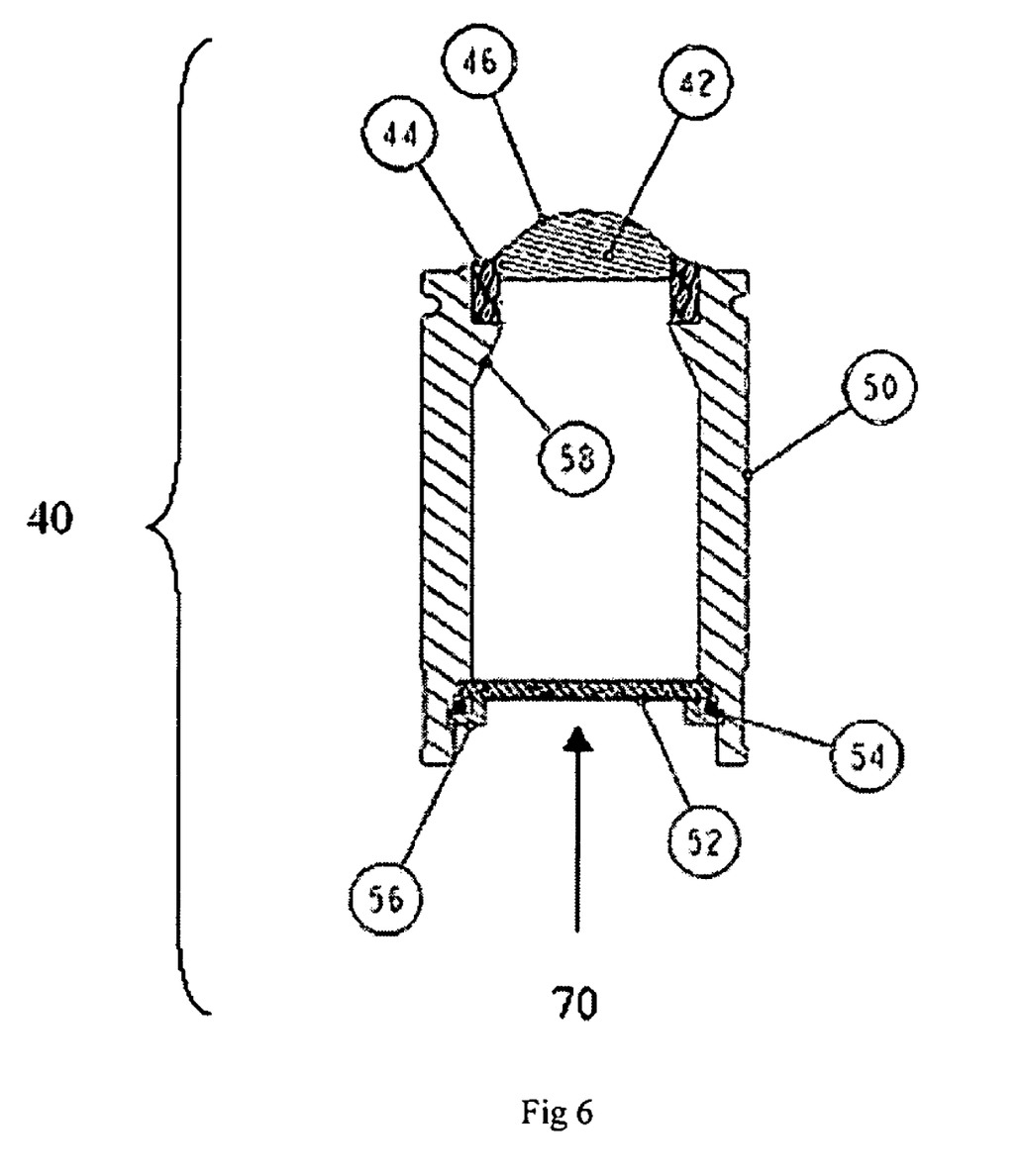
FIG. 6 an assembled cross-sectional view of the male mold component of FIG. 4.

FIGS. 4-6 show another mold component 40 of an example embodiment of the molding system of the present invention. Mold component 40 preferably comprises a transmissive portion 42, which allows passage of UV light or other energy used to cure the polymer used to form the molding. The transmissive portion 42 is preferably fabricated from an optically clear material that is durable against wear, temperature and electromagnetic energy, has good surface finish qualities, and has good IR and UV transmittance, such as for example Topas® COC grade 8007-S10. The mold component 40 preferably further comprises a masking portion 44 that blocks UV or other energy used to cure the polymer forming the molding. An example embodiment of the masking portion 44 comprises 8007-S10 Topas® COC mixed with a UV-blocker, such as a carbon black filler, in about a 50:1 ratio. The masking portion 44 prevents transmission of curing energy to the underlying polymer within the mold cavity, to prevent curing in the masked portions of the mold, and thereby more precisely define the edge of the molding formed beneath the interface of the masked and transmissive (unmasked) portions.

In the example embodiment depicted in FIGS. 4-6, the masking portion comprises a collar 44 having an inner diameter adapted to fit in close engagement with the generally circular disc-shaped transmissive portion 42. The masking collar 44 preferably has a thickness t of at least about 1000 times the wavelength of the energy used to cure the moldings. For example, for UV curing energy having a wavelength of about 300 nanometers, the collar preferably has a thickness of at least about 0.3 mm. More preferably, the masking collar 44 has a thickness of at least about 2-3 mm. A collar having a thickness that is large relative to the wavelength of the curing energy advantageously serves to align or collimate the light passing through the transmissive portion 42 without the need for a separate lens or collimator, reducing the potential spread of curing energy into masked portions of the mold cavity, and providing more precise control of the molding edge. The combined transmissive portion 42 and masking collar 44 define a male mold profile 46, sized and shaped to generate the desired molding geometry. For example, the male mold profile 46 preferably defines a generally circular convex curve for molding a contact lens. The mold component 40 optionally further comprises a mounting sleeve or bushing 50, having a mounting bore formed in one end for securely engaging the outer diameter of the masking collar 44. A glass plate 52 is preferably retained in the bushing 50 by an O-ring 54 and a retaining ring 56, as shown. The male mold sleeves 50 preferably have a tapered interior portion 58 that assists the curing process.

The transmissive portion 42 is preferably fabricated from clear Topas® COC rod or extrusion stock, and machined into a rough blank. A similar machining process is applied to fabricate the masking collar 44 from a Topas® COC molding or extrusion impregnated with a UV-blocker. The masking collar blanks generally resemble a washer or a doughnut, with a center hole for receiving the clear transmissive portion. The back surface of the transmissive portion 42 is cut or machined, for example using a diamond lathe or turning center, to optical tolerances. The transmissive portion is pressed into the center opening of the masking collar. The mask 44 and optics 42 are pressed into the brass sleeve 50. The outer mask 44 preferably rests on the sleeve 50 and holds the optics in place. The back optical surface preferably does not touch the sleeve 50. Once the sleeve 50, mask 44 and optics 42 have been assembled, the front surface optics are finished on the diamond turning center. A surface on the sleeve 50 is preferably used for setup in production as the tooling reference for the front surface optics. The mask and optics preferably are machined smooth, appearing as a single continuous piece when the final optics are cut on the front surface. The finished surface consists of the mask and optics and is optical quality. After the optics are finished, the quartz window 52 is installed on the bottom of the brass sleeve 50, along with the o-ring 54 and the window retainer 56.

In the depicted embodiment, the male mold component comprises the UV transmissive portion and the UV-blocking masking portion of the molding system, and the female mold component comprises the UV-absorptive portion. The reverse configuration is also within the scope of the present invention, wherein the male mold component comprises a UV-absorptive material and the female mold component comprises a UV-transmissive portion and a UV-blocking masking portion. Likewise, mold profile geometries other than those depicted are within the scope of the invention.

In use, the mold components and mold system of the present invention enable an improved method of forming a polymeric molding such as a contact lens or other polymeric item. A first mold component 40 and a second mold component 10 are engaged to define a mold cavity between their respective mold profiles 46, 12. A prepolymer material is deposited into the mold cavity prior to closing the mold or through a fill channel. The prepolymer material is cured from the liquid state through the transmissive portion 42 using UV light or other curing energy, indicated by direction arrow 70 in the example embodiment of FIG. 6. The masking portion 44 blocks the curing energy from causing polymer in masked portions of the mold cavity to cure, thereby more precisely defining the edge(s) of the final molding. The UV-absorptive material prevents or reduces unwanted reflection in the mold chamber, and the molding irregularities potentially caused thereby. After curing, the molding is optionally inspected in the mold cavity to identify any defects. For example, the molding is illuminated by IR light, indicated by direction arrow 72, through the mold component 10 and inspected using a charge-coupled device (CCD) camera and software-implemented inspection algorithms. The molds are opened and the moldings de-molded for further inspection, processing and/or packaging.

While the invention has been described with reference to preferred and example embodiments, it will be understood by those skilled in the art that a variety of modifications, additions and deletions are within the scope of the invention, as defined by the following claims.

What is claimed is:

1. A molding system comprising first and second mold components, at least one of said first and second mold components comprising a generally circular disc-shaped transmissive portion and a masking collar having an inner diameter adapted to fit in close engagement with the transmissive portion, wherein said transmissive portion is made from an optically clear material and allows passage of curing energy therethrough, and wherein the masking collar is made from a material comprising a UV-blocker and substantially blocks passage of curing energy therethrough, wherein said masking collar comprises a polymeric material impregnated with carbon black filler, wherein the masking collar generally resembles a washer or a doughnut, with a center hole for receiving the transmissive portion, wherein the transmissive portion is pressed into the center opening of the masking collar and the masking collar is mounted within a bushing sleeve, wherein the at least one of said first and second mold components comprises a male mold profile.

2. The molding system of claim 1, wherein the optically clear material comprises a cyclic-olefin copolymer.

3. The molding system of claim 1, wherein the curing energy comprises UV light having a wavelength of between about 4 nanometers to about 380 nanometers, and the masking collar has a thickness of at least about 1000 times the wavelength of the curing energy.

4. The molding system of claim 3, wherein the masking collar has a thickness of at least about 2 mm.

5. The molding system of claim 1, wherein the first mold component comprises the transmissive portion and the masking collar, and wherein the second mold component comprises a UV absorber.

6. The molding system of claim 5, wherein the first mold component comprises a male mold component, and wherein the second mold component comprises a female mold component.

7. A mold component for casting and curing a polymeric item, said mold component comprising:
a transmissive portion comprising a generally clear, amorphous cyclic-olefin copolymer transparent to curing energy; and
a masking collar comprising a polymeric material impregnated with carbon black filler, wherein the masking collar has inner diameter adapted to fit in close engagement with the transmissive portion, wherein the masking collar generally resembles a washer or a doughnut, with a center hole for receiving the transmissive portion, wherein the transmissive portion is pressed into the center opening of the masking collar and the masking collar is mounted within a bushing sleeve.

8. The mold component of claim 7, wherein the transmissive portion comprises a male mold profile.

9. The mold component of claim 8, wherein the curing energy comprises UV light having a wavelength of between about 4 nanometers to about 380 nanometers, and wherein the masking collar has a thickness of at least about 1000 times the wavelength of the curing energy.

10. The mold component of claim 9, wherein the masking collar has a thickness of at least about 2 mm.

11. A molding system comprising:
a first mold component comprising a generally circular disc-shaped transmissive portion and a masking collar having an inner diameter adapted to fit in close engagement with said transmissive portion, the transmissive portion allowing passage of UV energy therethrough, and the masking collar substantially blocking passage of UV energy therethrough, wherein said masking collar comprises a polymeric material impregnated with carbon black filler, wherein the masking collar generally resembles a washer or a doughnut, with a center hole for receiving the transmissive portion, wherein the transmissive portion is pressed into the center opening of the masking collar and the masking collar is mounted within a bushing sleeve; and
a second mold component comprising a UV absorber, wherein the first and second mold components are engageable to define a mold cavity.

12. The molding system of claim 11, wherein the first mold component comprises a male mold profile, and wherein the second mold component comprises a female mold profile.

13. A method of forming a polymeric molding, said method comprising
engaging a first mold component and a second mold component to define a mold cavity, said first mold component comprising a generally circular disc-shaped UV-transmissive portion and a UV-blocking collar having an inner diameter adapted to fit in close engagement with the UV-transmissive portion; wherein said UV blocking collar comprises a polymeric material impregnated with carbon black filler, wherein the UV-blocking collar generally resembles a washer or a doughnut, with a center hole for receiving the UV-transmissive portion, wherein the UV-transmissive portion is pressed into the center opening of the UV-blocking collar and the UV-blocking collar is mounted within a bushing sleeve;
depositing a dose of prepolymer material within the mold cavity; and
exposing at least a portion of the prepolymer material to UV energy through the UV-transmissive portion of the first mold component wherein said transmissive portion comprises a generally clear, amorphous polymeric material.

14. The method of claim 13, further comprising reducing reflection of UV energy within the mold cavity by incorporating a UV-absorber into said second mold component.

15. The method of claim 13, wherein the first mold component comprises a male mold component, and wherein the second mold component comprises a female mold component, and wherein the step of depositing a dose of prepolymer material within the mold cavity comprises depositing prepolymer material within the second mold component prior to engaging the first and second mold components.

* * * * *